United States Patent
Yoshida et al.

[11] Patent Number: 5,903,329
[45] Date of Patent: * May 11, 1999

[54] REFLECTIVE TYPE LCD WITH COLOR FILTERS HAVING BLACK PORTIONS

[75] Inventors: Hidefumi Yoshida; Makoto Ohashi; Ikuo Tomita, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,371

[22] Filed: Jun. 24, 1997

Related U.S. Application Data

[63] Continuation of application No. 08/725,959, Oct. 7, 1996, abandoned, which is a continuation of application No. 08/077,718, Jun. 17, 1993, abandoned.

[30] Foreign Application Priority Data

Jul. 2, 1992 [JP] Japan .................................... 4-175598

[51] Int. Cl.$^6$ ....................... G02F 1/1333; G02F 1/1335; G02F 1/13
[52] U.S. Cl. ............................ 349/106; 349/86; 349/113; 349/182
[58] Field of Search ....................... 359/68, 51; 349/106, 349/86, 113, 182

[56] References Cited

U.S. PATENT DOCUMENTS

| | | | |
|---|---|---|---|
| 4,222,641 | 9/1980 | Stolov | 359/68 |
| 4,560,241 | 12/1985 | Stolov et al. | 359/68 |
| 4,690,511 | 9/1987 | Watanabe | 359/68 |
| 4,800,375 | 1/1989 | Silverstein et al. | 359/68 |
| 4,946,259 | 8/1990 | Matino et al. | 359/68 |
| 5,059,000 | 10/1991 | Kaneko et al. | 359/68 |
| 5,078,475 | 1/1992 | Sekimura et al. | 359/68 |
| 5,317,431 | 5/1994 | Yoshida et al. | 359/68 |
| 5,452,113 | 9/1995 | Ikeno | 359/53 |
| 5,587,819 | 12/1996 | Sunohara et al. | 349/106 |

FOREIGN PATENT DOCUMENTS

| | | | |
|---|---|---|---|
| 59-180525 | 10/1984 | Japan | 359/68 |
| 60-244933 | 12/1985 | Japan | 359/68 |
| 60-263122 | 12/1985 | Japan . | |
| 62-10620 | 1/1987 | Japan | 359/68 |
| 1-213622 | 8/1989 | Japan | 359/68 |
| 3-186816 | 8/1991 | Japan | 359/68 |
| 4-371923 | 12/1992 | Japan | 359/68 |

OTHER PUBLICATIONS

Uchida et al., "Reflective Type Multicolor Liquid Crystal Display," *Japanese Electronic Display Society*, vol. 85, No. 11, Apr. 26, 1985, pp. 71–77.

*Primary Examiner*—William L. Sikes
*Assistant Examiner*—Toan Ton
*Attorney, Agent, or Firm*—Staas & Halsey

[57] ABSTRACT

A reflective type liquid crystal display device including a layer of liquid crystal having a light scattering property such as a polymer dispersed type liquid crystal or a phase change type liquid crystal. The layer of liquid crystal is arranged between first and second plates having transparent electrodes, respectively, the first plate being transparent and the second plate having a reflecting layer. A color filter including red, green, and blue color portions and a black color portion, and an internal transparent plate having a thickness to provide a sufficient distance between the layer of liquid crystal and the color filter to diffuse the appearance of the color filter viewed through the scattering liquid crystal in the light scattering mode are also placed between the first and second plates. The layer of liquid crystal having light scattering property is brought into a light scattering mode to produce a white display when the voltage is not applied, and into a transparent mode to produce a color display and a black display when the voltage is applied.

21 Claims, 5 Drawing Sheets

REFLECTIVE TYPE LCD WITH COLOR FILTERS HAVING BLACK PORTIONS

This application is a continuation of application Ser. No. 08/725,959, filed Oct. 7, 1996, now abandoned which is a continuation of application Ser. No. 08/077,718, filed Jun. 17, 1993, now abandoned.

BACKGROUND OF THE INVENTION

1. Field of the Invention

The present invention relates to a reflective type liquid crystal display device.

2. Description of the Related Art

There are transmitting-type liquid-crystal display devices in which light passes through the liquid crystal panel from the rear to the front thereof, and reflective-type liquid-crystal display devices in which a light enters from the front of the liquid crystal panel, is reflected at a reflecting layer at the rear of the liquid-crystal panel and exits from the front side of the liquid crystal panel. The transmitting type liquid crystal display device can include a back-light or the like on the rear of the liquid crystal panel to enhance brightness and contrast. However, the reflective type liquid crystal display device cannot use a back light, and thus brightness and contrast are relatively low. Recently, a demand for a reflective-type liquid crystal display device with increased brightness and contrast, and color, has arisen.

A reflective-type liquid crystal display device providing with color is disclosed, for example, in the report of the Japanese electronic display society, "ED85-40, p81". This is shown in FIGS. 6 and 7 in the attached drawings. In FIGS. 6 and 7, the layer of liquid crystal 3 is arranged between the first and second plates 1 and 2, the first plate 1 is transparent, and the second plate 2 has a reflecting surface 4 for reflecting a light entering from the first plate 1. The layer of liquid crystal 3 comprises a guest-host phase change type liquid crystal having a dichroic dye 5 mixed therein. The first plate 1 has a color filter 6 formed on the inner surface thereof.

In the phase-change liquid crystal display device, molecules of the liquid crystal are in a twisted cholesteric phase when the voltage is not applied, as shown in FIG. 6, and into a nematic phase, in which molecules of the liquid crystal are aligned perpendicular to the plates 1 and 2, when the voltage is applied, as shown in FIG. 7. Therefore, in the condition of FIG. 6, the particles of the dichroic dye 5 with the molecules of the liquid crystal 3 are generally randomly distributed, and the light inputting from the first plate 1 impinges against the particles of the dichroic dye 5 and absorbed therein to produce a black display. In the condition of FIG. 7, the particles of the dichroic dye 5 with the molecules of the liquid crystal 3 become perpendicular to the plates 1 and 2, and the light entering from the first plate 1 passes through the particles of the dichroic dye 5. Thus, the light entering from the first plate 1 is reflected at the reflecting layer 4 of the second plate 2, and passes through the color filter 6 to produce a color display corresponding to the color or colors of the color filter 6. When the pixel electrode corresponding to all colors in one pixel are switched on, a white display is produced.

In the above described prior art reflective-type liquid crystal display device, to produce a color display or a white display, the light entering from the first plate 1 must initially pass through the color filter 6, then through the layer of liquid crystal 3 and the dichroic dye 5, and be reflected at the reflecting layer 4 to return to the layer of liquid crystal 3, the dichroic dye 5, and the color filter 6. However, the transmissivity of the color filter 6 is low, and the amount of the light first passing through the color filter 6 is reduced. Also, since the light passing through the color filter 6 further passes through the layer of liquid crystal 3 and the dichroic dye 5, and returns to the color filter 6 after reflected at the reflecting layer 4, brightness of the color display and the white display thus obtained is relatively low.

SUMMARY OF THE INVENTION

The object of the present invention is to provide a liquid crystal display device which can provide a bright white display and which can provide a high contrast between white and black displays.

According to the present invention, there is provided a liquid crystal display device comprising first and second opposite plates having respective inner sides, the first plate being transparent, a first transparent electrode formed on the inner side of the first plate, a reflecting surface formed on the inner side of the second plate for reflecting a light incident from the first plate, a color filter formed on the reflecting surface of the second plate, a third plate formed on the color filter, the third plate being transparent, a second transparent electrode formed on the third plate, and a layer of liquid crystal having light scattering property and arranged between the first and second plates, whereby a manner of scattering of liquid crystal having light scattering property is controlled by controlling the voltage applied between the first and second transparent electrodes. For example, the layer of the liquid crystal is brought into a light scattering mode to produce a white display when the voltage is not applied between the first and second transparent electrodes, and into a transparent mode to produce a color display when the voltage is applied between the first and second transparent electrodes.

In this arrangement, it is possible to produce a white display by bringing the layer of liquid crystal having light scattering property into a light scattering mode, and thus it is possible to obtain a bright white display since this light scattering occurs just below the first plate from which the light inputs. Then, it is possible to produce a color display based on the colors of the color filter when the layer of liquid crystal having light scattering property is brought into a transparent mode. In this case, it is possible to obtain a bright color display since the observer can see the colors on the color filter as if the observer directly sees the color filter to which the light is illuminated.

In the case where the color filter includes portions presenting specific colors and a portion of black which can be seen in the transparent mode, it is possible to obtain a good black display. Accordingly, it is possible to enhance a contrast between the white and the black.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
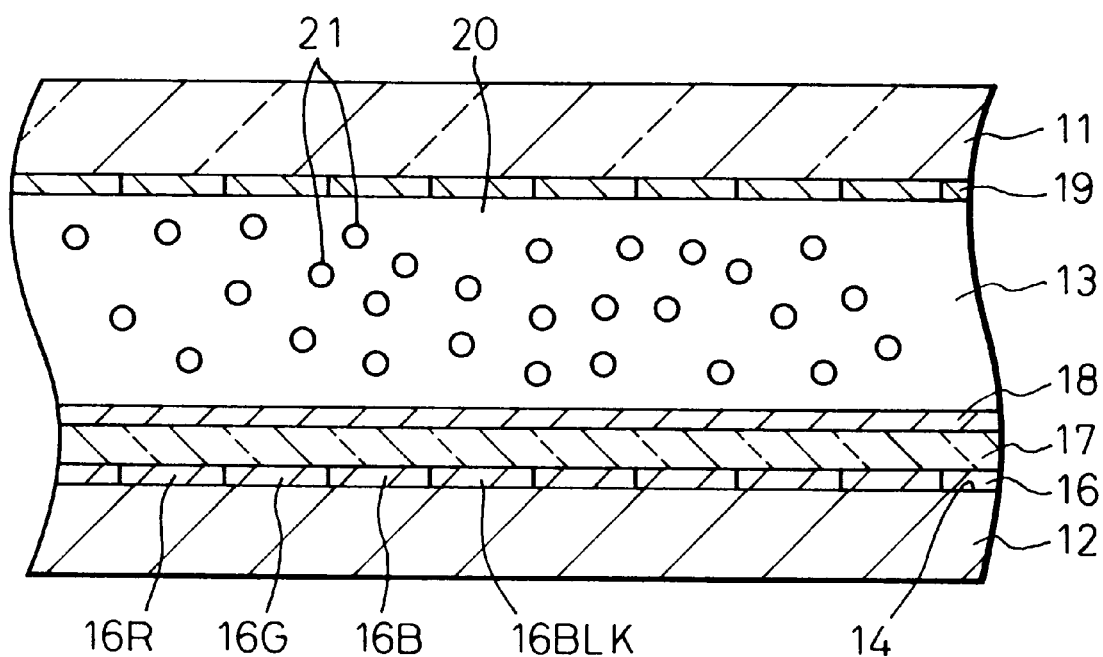
FIG. 1 is a cross-sectional view of a liquid crystal display device according to the first embodiment of the present invention.

FIG. 1 shows a liquid crystal display device according to the first embodiment of the present invention. The liquid crystal display device comprises first and second opposite plates 11 and 12, and a layer of liquid crystal 13 arranged between the plates 11 and 12. The first plate 11 is formed from a transparent glass plate. The second plate 12 has a reflecting surface 14 on the inner surface thereof for reflecting a light inputting from the first plate 11. The second plate 12 can be formed from a white glass plate (for example, Neoseram N-11 distributed by Nihon Electric Glass K.K. in Japan), and in this case, the reflecting surface 14 comprises one of the opposite surfaces of the glass plate 12. It is also possible that the second plate 12 is a white glass plate having a reflecting film applied to one of the surfaces thereof by vapor deposition to form the reflecting layer 14.

A color filter 16 is arranged on the inner side of the second plate 12. In the embodiment, the color filter 16 includes, in each pixel, portions presenting specific colors, i.e., a red color portion 16R, a green color portion 16G, and a blue color portion 16B. These colors become an achromatic color when added together. It is possible to use other combinations of colors which become an achromatic color when added together, such as the combination of purple and green, blue and yellow, or light blue and red. The color filter 16 also includes, in each pixel, a black color portion 16BLK which is not covered and can be seen.

An internal transparent plate 17 having a predetermined thickness is arranged on the inner side of the color filter 16 of the second plate 12. The internal transparent plate 17 can be formed from a resin curable by an ultraviolet beam, such as methacrylate resin or acrylate resin.

A layer of transparent electrode 18 is arranged further on the inner side of the internal transparent plate 17 from the second plate 12, and a layer of transparent electrode 19 is arranged on the inner side of the first plate 11. The transparent electrode 18 is a common electrode and the transparent electrode 19 is a plurality of pixel electrodes arranged in register with the color portions of the color filter 16. It is possible to arrange TFTs (thin-film transistors) on the inner surface of the first plate 11 so as to drive the transparent electrode 19 by an active matrix driver. The transparent electrodes 18 and 19 are formed from ITO (indium-tinoxide). The thickness of the transparent electrodes 18 and 19 formed from ITO is approximately 100 angstroms, and preferably, the thickness of the internal transparent plate 17 is greater than that of the transparent electrodes 18 and 19. Preferably, the thickness of the internal transparent plate 17 is in the range from approximately 1 micron to 200 microns, and in particular, the thickness of the internal transparent plate 17 is in the range from approximately 10 micron to 30 microns, when the thickness of the layer of liquid crystal 13 is in the range from approximately 20 micron to 50 microns.

Figure 2:
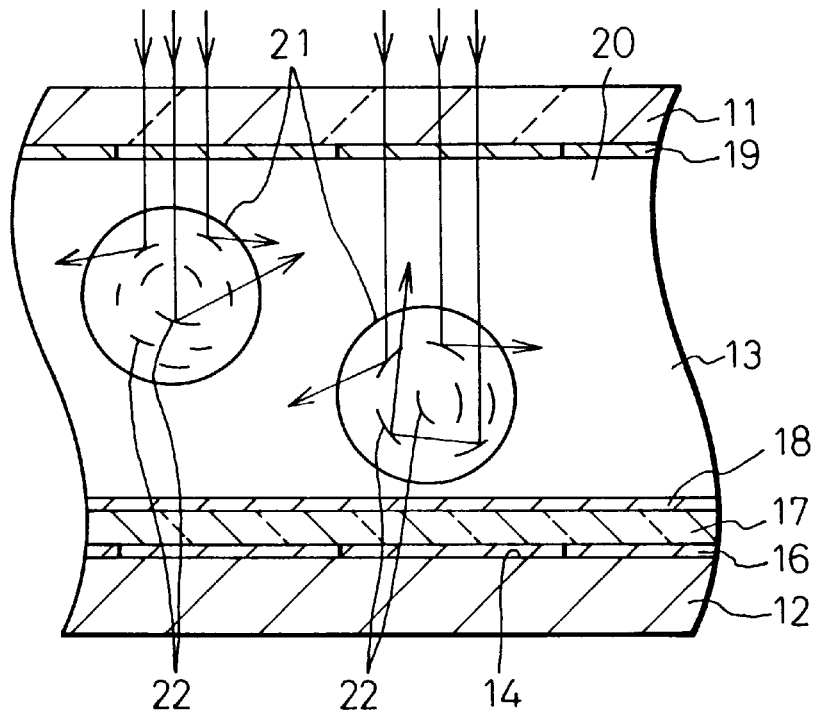
FIG. 2 is a partially enlarged view of the device of FIG. 1, showing when voltage is not applied.
Figure 3:
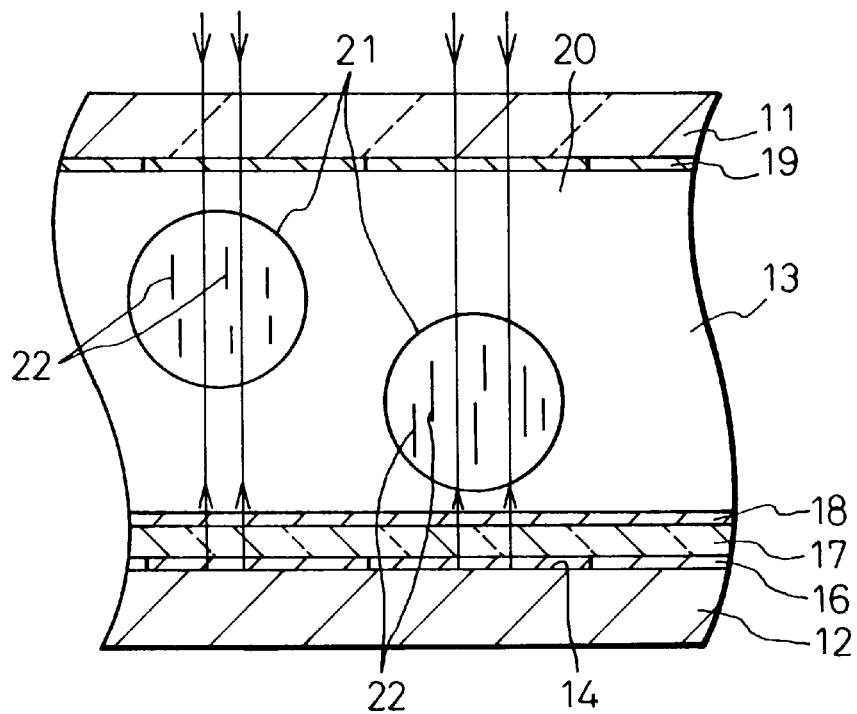
FIG. 3 is a partially enlarged view of the device of FIG. 1, showing when voltage is applied.

As shown in FIGS. 1 to 3, the layer of liquid crystal 13 having light scattering property comprises a polymer dispersed type liquid crystal in which liquid crystal capsules 21 are dispersed in a transparent resin 20. The liquid crystal capsules 21 are small capsules of liquid crystal molecules 22 gathering together in the transparent resin 20. This layer of liquid crystal 13 having light scattering property is obtained, for example, by mixing a nematic-fluoro-liquid crystal and an ultraviolet light-curable resin such as methacrylate resin or acrylate resin, inserting the mixture into a space between the first and second plates 11 and 12, and then irradiating the ultraviolet light. By irradiating the ultraviolet light, the resin is cured and simultaneously the liquid crystal molecules 22 gathers together little by little all over the resin 20 to form the liquid crystal capsules 21. The liquid crystal molecules 22 in the liquid crystal capsules 21 are randomly aligned.

In the operation of the above described liquid crystal display device, when the voltage applied between the transparent electrodes 18 and 19 is lower than a threshold voltage (when the voltage is not applied), as shown in FIG. 2, the liquid crystal molecules 22 are randomly aligned and thus the light entering from the first plate 11 impinges against the liquid crystal molecules 22 of the layer of liquid crystal 13 and is scattered in all directions as indicated by the arrows (a light scattering mode). In this condition, when the observer sees the first plate 11, the layer of liquid crystal 13 having a light scattering property can be seen as a white cloud and the color filter 16 under the layer of liquid crystal 13 cannot be seen. In this way, it is possible to produce a white display by bringing the layer of liquid crystal 13 having light scattering property into a light scattering mode, and thus it is possible to obtain a bright white display since the light scattering occurs just below the first plate 11 from which the light inputs.

Also, according to the present invention, the internal transparent plate 17 is arranged between the layer of liquid crystal 13 and the color filter 16. This internal transparent plate 17 has a thickness greater than that of the transparent electrodes 18 and 19 of ITO and is intended for providing a sufficient distance between the layer of liquid crystal 13 and the color filter 16 to diffuse the appearance of the color filter 16 viewed through the scattering liquid crystal in the light scattering mode. If the internal transparent plate 17 does exist and the layer of liquid crystal 13 is located very close to the color filter 16, there is a case in which the color filter 16 is seen through the layer of liquid crystal 13 in a white cloudy condition, but if the internal transparent plate 17 having a predetermined thickness is arranged between the layer of liquid crystal 13 and the color filter 16, according to the present invention, it is possible to diffuse the appearance of the color filter 16 so that the color filter 16 cannot be seen through the layer of liquid crystal 13 in a white cloudy condition. This phenomena can be explained by the fact that when viewing an object via a semi-transparent plate, the appearance of the object varies depending on whether the semi-transparent plate is near or far from the object. Accordingly, it is possible to obtain a white display when the layer of the liquid crystal 13 having the light scattering property is in the light scattering mode.

When a color display of a desired color is to be produced, a voltage higher than a threshold voltage is applied between the common electrode 19 and a portion of the pixel electrode 18 corresponding to one or some of the red color pixels 16R, the green color pixels 16G and the blue color pixels 16B of the color filter 16. Then, as shown in FIG. 3, the liquid crystal molecules 22 in the liquid crystal capsules 21 become perpendicular to the surfaces of the first and second plates 11 and 12, and the light entering from the first plate 11 passes the liquid crystal molecules 22 in the layer of liquid crystal 13 as shown by the arrows (transparent mode). The light transmitting the layer of the liquid crystal 13 reaches the color filter 16, is reflected at the reflecting layer, then returns to the color filter 16 and the layer of the liquid crystal 13, and finally outputs from the first plate 11. In this case, it is possible to obtain a bright color display since the observer can see the colors on the color filter 16 as if the observer directly sees the color filter 16 which is illuminated by the light.

Also, when a black display is to be produced, the voltage higher than a threshold voltage is applied between the common electrode 19 and a portion of the pixel electrode 18 corresponding to all of the red color portion 16R, the green color portion 16G, the blue color portion 16B and the black color portion 16BLK of the color filter 16. In this case too, as shown in FIG. 3, the liquid crystal molecules 22 in the liquid crystal capsules 21 become perpendicular to the surfaces of the first and second plates 11 and 12, and the light inputting from the first plate 11 transmit the liquid crystal molecules 22 in the layer of liquid crystal 13 as shown by the arrows (transparent mode). In this case, it is possible to obtain a clear black display since the colors emitting from the red color portion 16R, the green color portion 16G and the blue color portion 16B of the color filter 16 become an achromatic color when added together and only the black from the black color portion 16BLK can be visually recognized.

Figure 4:
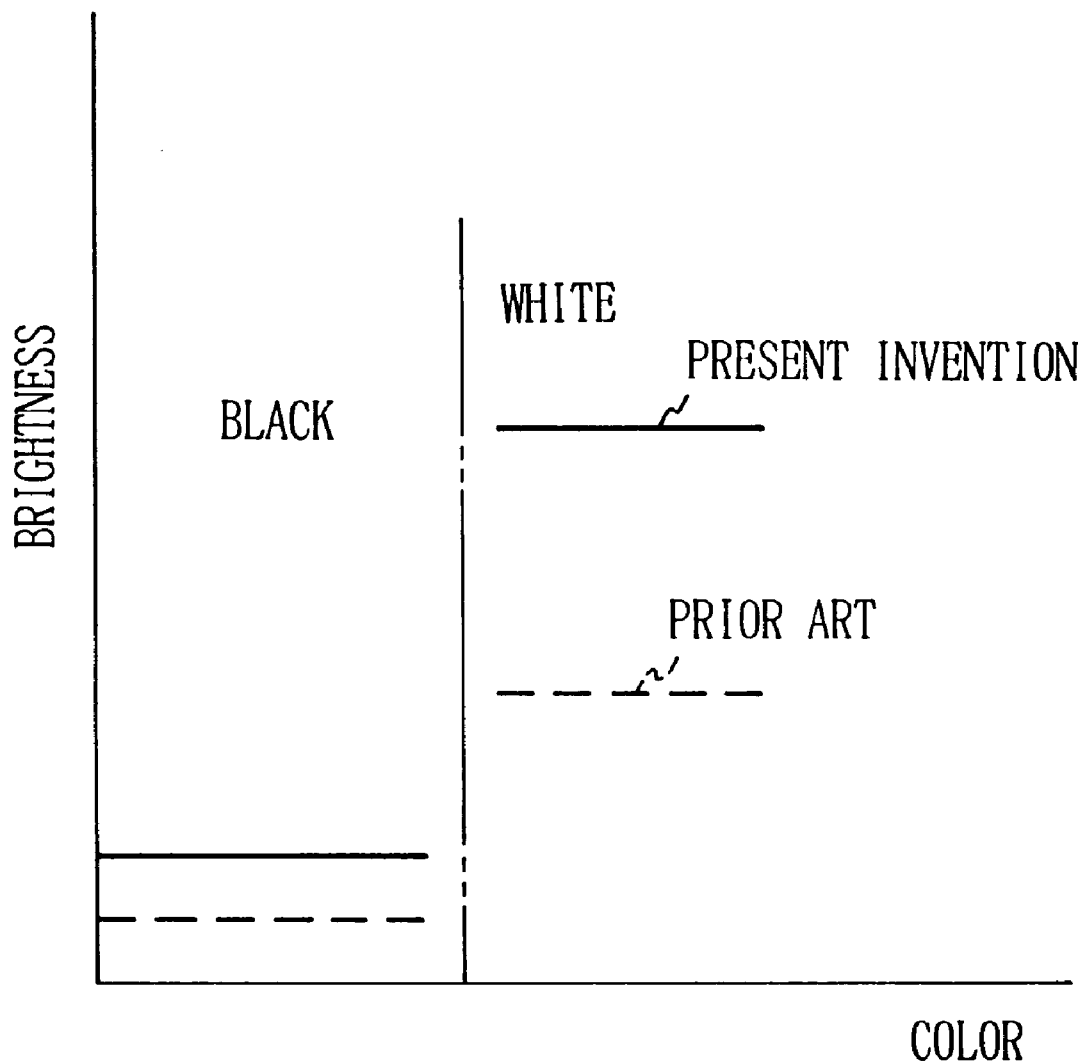
FIG. 4 is a view illustrating brightness of white and black displays of the present invention and the prior art.
Figure 6:
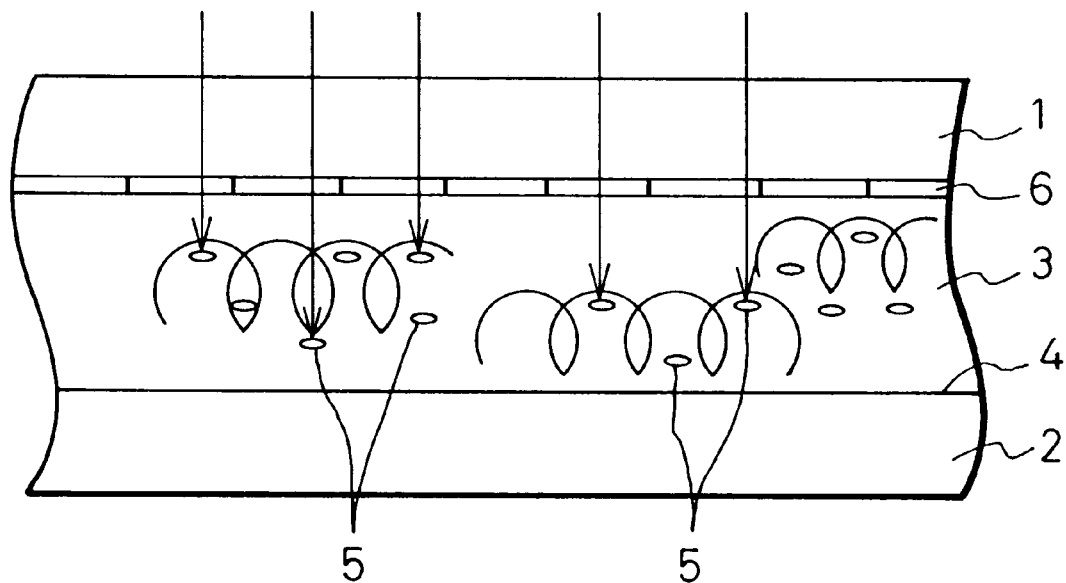
FIG. 6 is a view illustrating a prior art.
Figure 7:
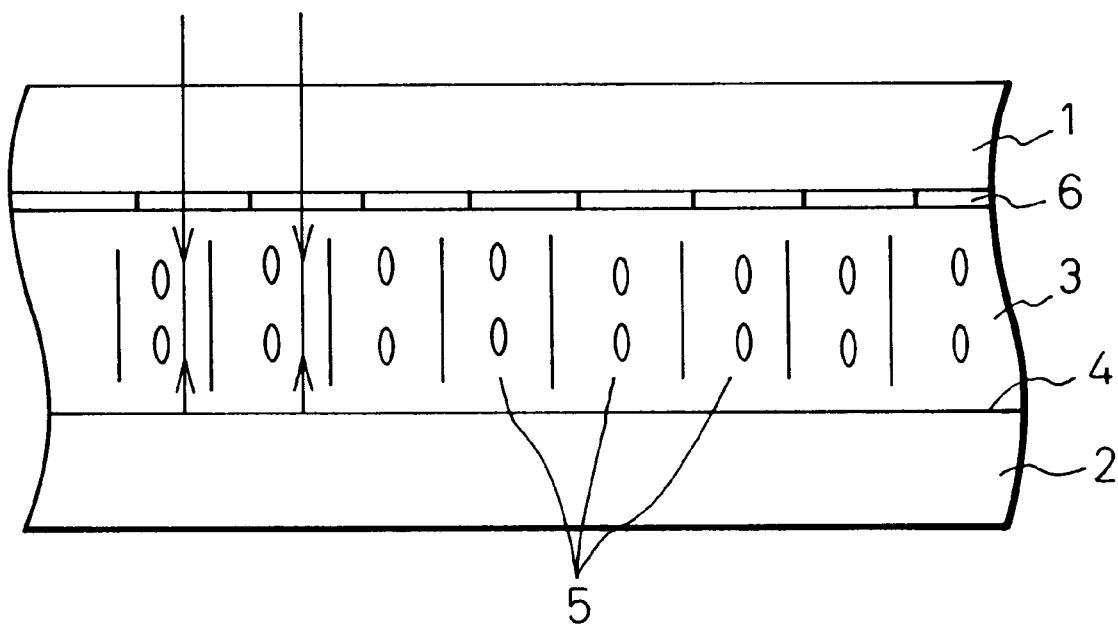
FIG. 7 is a view of the device of FIG. 6, showing when the voltage is applied.

FIG. 4 shows brightness of white and black displays of the present invention and the prior art, in which the solid line shows the brightness obtained according to the present invention and the broken line shows the brightness obtained according to the prior art of FIGS. 6 and 7. As shown in FIG. 4, regarding the brightness of the black, the prior art is higher than the present invention. But, regarding the brightness of the white, the present invention is remarkably higher than the prior art. In this way, it is possible, according to the present invention, to obtain very bright white and color displays and to realize a high contrast by providing the black color portion 16BLK in the color filter 16.

Figure 5:
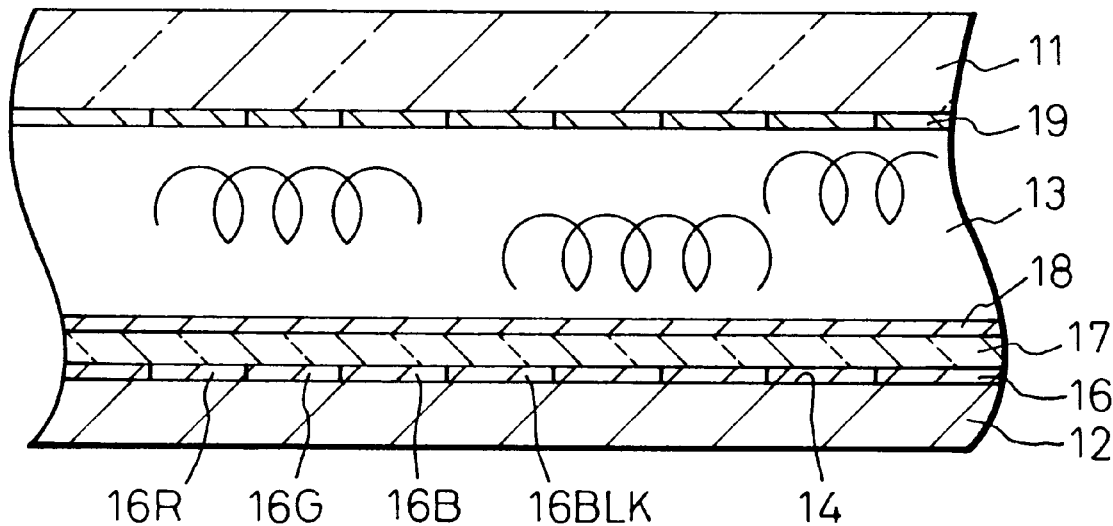
FIG. 5 is a cross-sectional view of a liquid crystal display device according to the second embodiment of the present invention.

FIG. 5 shows a liquid crystal display device according to the second embodiment of the present invention. The liquid crystal display device comprises first and second opposite plates 11 and 12, and a layer of liquid crystal 13 arranged between the plates 11 and 12. The first plate 11 is formed from a transparent glass plate. The second plate 12 has a reflecting surface 14 formed on the inner side of the second plate 12 for reflecting a light incident from the first plate 11. A color filter 16 is arranged on the inner surface of the second plate 12, the color filter 16 including a red color portion 16R, a green color portion 16G, a blue color portion 16B, and a black color portion 16BLK. Also, an internal transparent plate 17 having a predetermined thickness is arranged on the inner side of the color filter 16 of the second plate 12. A layer of transparent electrode 18 is arranged further on the inner side of the internal transparent plate 17 from the second plate 12, and a layer of transparent electrode 19 is arranged on the inner side of the first plate 11.

The layer of liquid crystal 13 having light scattering property comprises a phase-change-type liquid crystal, but a dichroic dye is not included in this phase change type liquid crystal. In the phase change liquid crystal display device, molecules of the liquid crystal are in a twisted cholesteric phase when the voltage is not applied, as described previously with reference to FIG. 6, and thus generally randomly aligned. Accordingly, in this condition, the light entering from the first plate 11 impinges against the liquid crystal molecules of the layer of liquid crystal 13 having a light scattering property and is scattered in all directions (a light scattering mode). In this condition, when the observer sees the first plate 11, the layer of liquid crystal 13 having a light scattering property can be seen as a white cloud and the color filter 16 under the layer of liquid crystal 13 cannot be seen. In this way, it is possible to produce a white display when the voltage is not applied.

When the voltage is applied to the liquid crystal, molecules of the liquid crystal are aligned perpendicular to the plates 11 and 12 in a nematic phase when the voltage is applied, as described previously with reference to FIG. 7. Therefore, the light inputting from the first plate 11 transmit the liquid crystal molecules in the layer of liquid crystal 13 (transparent mode). The light transmitting the layer of the liquid crystal 13 reaches the color filter 16, and the observer can see the colors on the color filter 16. Accordingly, it is possible to obtain a bright color display and a clear black display.

As previously explained in detail, according to the present invention, it is possible to realize a very bright white display and a high contrast between the white and black displays.

We claim:

1. A liquid crystal display device comprising:
   first and second opposite plates having respective inner sides, said first plate being transparent;
   a first transparent electrode formed on the inner side of said first plate;
   a reflecting surface formed on the inner side of said second plate for reflecting light incident on said reflecting surface from said first plate;
   a color filter formed on said reflecting surface of said second plate and including portions of specific colors and portions colored in black, the portions colored in black being grouped respectively with the portions of specific colors;
   a second transparent electrode formed on said color filter; and
   a layer of liquid crystal having a light scattering property and arranged between the first and second plates, whereby a manner of scattering of the liquid crystal is controlled by controlling a voltage applied between said first and second transparent electrodes, and
      when the layer of liquid crystal is brought into a transparent mode, the portion of black of the color filter can be seen from above the first plate and through the layer of liquid crystal, and
      when the layer of liquid crystal is brought into a light scattering mode, the layer of liquid crystal appears white and blocks the view of the color filter when seen from above the first plate.

2. A liquid crystal display device according to claim 1, further comprising a third transparent plate having a predetermined thickness and arranged between the color filter and the second transparent electrode.

3. A liquid crystal display device according to claim 2, wherein the third transparent plate has a thickness which provides a sufficient distance between the layer of liquid crystal and the color filter to diffuse the appearance of the color filter viewed through the scattering liquid crystal in a light scattering mode.

4. A liquid crystal display device according to claim 2, wherein the third transparent plate has a thickness greater than the thickness of the second transparent electrode.

5. A liquid crystal display device according to claim 2, wherein the third transparent plate has a thickness of approximately 1 micron to 200 microns and the second transparent electrode comprises ITO.

6. A liquid crystal display device according to claim 2, wherein the specific colors of the portions of specific colors of the color filter become an achromatic color when added together.

7. A liquid crystal display device according to claim 1, wherein the layer of liquid crystal comprises liquid crystal selected from the group comprising a polymer dispersed type liquid crystal and a phase change type liquid crystal.

8. A liquid crystal display device according to claim 1, wherein the second plate is a white glass plate having opposite surfaces, and the reflecting surface comprises one of the opposite surfaces of the second plate.

9. A liquid crystal display device according to claim 1, wherein the second plate is a white glass plate having opposite surfaces, and the reflecting surface comprises a reflecting film applied to one of the opposite surfaces of the second plate.

10. A liquid crystal display device according to claim 1, wherein the layer of liquid crystal comprises a cholesteric liquid crystal.

11. A liquid crystal display device comprising:

first and second plates having respective inner sides, the first plate being transparent and the first and second plates being positioned with the respective inner sides facing each other;

a layer of liquid crystal being changeable to a light scattering mode and a transparent mode, the layer of liquid crystal being positioned between the first and second plates;

a first transparent electrode formed on the inner side of the first plate;

a reflecting surface formed on the inner side of the second plate for reflecting light incident on the reflecting surface from the first plate;

a color filter formed on the reflecting surface of the second plate and including portions of specific colors and portions colored in black, the portions colored in black being grouped respectively with the portions of specific colors; and a second transparent electrode formed on the color filter, the layer of liquid crystal being changeable to the light scattering mode and the transparent mode in accordance with a voltage applied between the first and second transparent electrodes wherein, when the layer of liquid crystal is in the transparent mode, the portion of black of the color filter is visible through the first plate, and when the liquid crystal is in the light scattering mode, the liquid crystal appears white and blocks the view of the color filter when viewed through the first plate.

12. A liquid crystal display device according to claim 11, further comprising a third plate being transparent and having a predetermined thickness, the third plate being arranged between the color filter and the second transparent electrode.

13. A liquid crystal display device according to claim 12, wherein the third plate has a thickness which provides a sufficient distance between the layer of liquid crystal and the color filter to diffuse the appearance of the color filter viewed through the liquid crystal in the light scattering mode.

14. A liquid crystal display device according to claim 12, wherein the third plate has a thickness greater than the thickness of the second transparent electrode.

15. A liquid crystal display device according to claim 12, wherein the third plate has a thickness of approximately 1 micron to 200 microns and the second transparent electrode comprises ITO.

16. A liquid crystal display device according to claim 12, wherein the specific colors of the portions of specific colors of the color filter become an achromatic color when added together.

17. A liquid crystal display device according to claim 11, wherein the layer of liquid crystal comprises liquid crystal selected from the group comprising a polymer dispersed type liquid crystal and a phase change type liquid crystal.

18. A liquid crystal display device according to claim 11, wherein the second plate is a white glass plate having opposite surfaces, and the reflecting surface comprises one of the opposite surfaces of the second plate.

19. A liquid crystal display device according to claim 11, wherein the second plate is a white glass plate having opposite surfaces, and the reflecting surface comprises a reflecting film applied to one of the opposite surfaces of the second plate.

20. A liquid crystal display device according to claim 11, wherein the layer of liquid crystal comprises a cholesteric liquid crystal.

21. A liquid crystal display device comprising:

first and second plates having respective inner sides, the first plate being transparent and the first and second plates being positioned with the respective inner sides facing each other;

a layer of cholesteric liquid crystal being changeable to a light scattering mode and a transparent mode, the layer of cholesteric liquid crystal being positioned between the first and second plates;

a first transparent electrode formed on the inner side of the first plate;

a reflecting surface formed on the inner side of the second plate for reflecting light incident on the reflecting surface from the first plate;

a filter formed on the reflecting surface of the second plate and including portions of specific colors and portions colored in black, the portions colored in black being grouped respectively with the portions of specific colors; and a second transparent electrode formed on the filter, the layer of cholesteric liquid crystal being changeable to the light scattering mode and the transparent mode in accordance with a voltage applied between the first and second transparent electrodes wherein, when the layer of cholesteric liquid crystal is in the transparent mode, the filter is visible through the first plate, and when the layer of cholesteric liquid crystal is in the light scattering mode, the layer of liquid crystal appears white and blocks the view of the filter when viewed through the first plate.

* * * * *